United States Patent
MacMillan (10) Patent No.: US 10,372,581 B1
(45) Date of Patent: Aug. 6, 2019

(54) INSTRUMENTATION OF PROGRAM CODE FOR DYNAMIC ANALYSIS

(75) Inventor: John R. MacMillan, Toronto (CA)

(73) Assignee: Quest Software Inc., Aliso Viejo, CA (US)

( * ) Notice: Subject to any disclaimer, the term of this patent is extended or adjusted under 35 U.S.C. 154(b) by 955 days.

(21) Appl. No.: 12/605,193

(22) Filed: Oct. 23, 2009

Related U.S. Application Data (60) Provisional application No. 61/108,409, filed on Oct. 24, 2008.

(51) Int. Cl.
*G06F 9/44* (2018.01)
*G06F 11/34* (2006.01)

(52) U.S. Cl.
CPC ...... *G06F 11/3466* (2013.01); *G06F 11/3476* (2013.01); *G06F 11/3495* (2013.01)

(58) Field of Classification Search
CPC ............. G06F 11/3466; G06F 11/3476; G06F 11/3495
See application file for complete search history.

(56) References Cited

U.S. PATENT DOCUMENTS

| | | | |
|---|---|---|---|
| 7,281,242 B2 | 10/2007 | Inamdar | |
| 7,389,494 B1* | 6/2008 | Cantrill | G06F 11/3624 717/125 |
| 7,484,209 B2 | 1/2009 | Avakian et al. | |
| 7,506,317 B2 | 3/2009 | Liang et al. | |
| 2002/0116600 A1* | 8/2002 | Smith | G06F 9/3851 712/218 |
| 2004/0158589 A1* | 8/2004 | Liang | G06F 11/3466 |
| 2005/0138111 A1* | 6/2005 | Aton | G06F 11/3476 709/201 |
| 2005/0235057 A1* | 10/2005 | Brodie | H04L 43/10 709/224 |
| 2007/0240142 A1* | 10/2007 | Brokenshire | G06F 8/4441 717/159 |
| 2009/0254889 A1* | 10/2009 | Prasadarao | 717/130 |

OTHER PUBLICATIONS

IBM, Source Code Instrumentation.*
Wikipedia, Instrumentation (computer programming).*
Gregory, "Managed, Unmanaged, Native: What Kind of Code is this?" Developer.com published Apr. 28, 2003, 3 pages.
Quest Software JProbe User Guide, Version 8.0, May 2008. pp. 1-310.

(Continued)

*Primary Examiner* — Jae U Jeon
*Assistant Examiner* — Lenin Paulino
(74) *Attorney, Agent, or Firm* — Winstead PC (57) ABSTRACT

Systems and methods for using a synchronization mechanism to dynamically update instrumentation during program execution are described herein. Using the synchronization mechanism, a decision tree structure of instruments can be avoided, saving processing resources. The synchronization mechanism can be a field or the like that is declared using a synchronization primitive. For example, the synchronization primitive can be a volatile or synchronized keyword in some programming languages. The field can refer to a currently-selected instrument implementation, thereby avoiding using a decision-tree structure to find a desired instrument implementation.

17 Claims, 6 Drawing Sheets

(56) References Cited

OTHER PUBLICATIONS

Binder et al., "Advanced Java Bytecode Instrumentation", PPPJ 2007, Sep. 5-7, 2007, Lisboa, Portugal. pp. 135-144.
Lorimer, "Instrumentation: Modify Applications with Java 5 Class File Transformations", 4 pages.
Binder et al., "Reengineering Standard Java Runtime Systems Through Dynamic Bytecode Instrumentation", Seventh IEEE International Working Conference on Source Code Analysis and Manipulation, pp. 91-100 2007.
Haines, Java Reference Guide—Troubleshooting Java Memory Issues, InformIT pp. 1-4, updated Jul. 29, 2005.
Aarniala, "Instrumenting Java Bytecode" Seminar work for the Compilers-course, Spring 2005, pp. 1-8.

\* cited by examiner

INSTRUMENTATION OF PROGRAM CODE FOR DYNAMIC ANALYSIS

RELATED APPLICATION

This application claims the benefit of priority under 35 U.S.C. § 119(e) of U.S. Provisional Patent Application No. 61/108,409, filed on Oct. 24, 2008, and entitled "Systems and Methods for Code Instrumentation for Dynamic Analysis," the disclosure of which is hereby incorporated by reference in its entirety.

BACKGROUND

Performance profiling is often used to investigate a computer program's behavior as the program runs. Through profiling, it can be determined which sections of a program can be improved for speed or memory usage, among other features. Many systems perform such profiling by inserting profiling instruments in source code, interpreted code, compiled code, machine code, or the like. For example, many profiling instrument include one or more routines that can perform tasks whenever the code containing the instrument is executed.

Interpreted code is one example of code that can be instrumented for profiling and for other uses. The interpreted code is translated into machine code at the time of execution, rather than being compiled directly into machine code. Managed code is one form of interpreted code that can execute under the management of a virtual machine. Examples of managed code can include Java bytecode operating under the Java Virtual Machine (JVM) and Intermediate Language code generated by the .NET Framework for C#, Visual Basic .NET, and Visual C++.

SUMMARY OF CERTAIN INVENTIVE ASPECTS

In currently available systems, instruments for profiling a target program often perform a predefined task each time they are run. To provide different instrument functionality, calls to multiple instrument routines are often inserted into a routine of the target program. In a typical scenario, a decision tree is constructed for calls to different instruments, such that an appropriate instrument is selected for a given scenario. For example, a user might select a certain type of program profiling that uses one instrument, and he might change the type of profiling to later use another type of instrument. Navigating the decision tree to switch between these instruments can impact execution time of the target program.

This disclosure describes, among other features, systems and methods for using a synchronization mechanism to dynamically update instrumentation during profiling or other analysis of a target program. Using the synchronization mechanism, instruments can be dynamically changed without using a decision tree structure of instruments, thereby saving processing resources. The synchronization mechanism can be a field, such as an object or the like, that is declared to be "volatile" or "synchronized." Advantageously, in certain embodiments, the synchronization field can be atomic, such that updates to instrumentation are performed in one uninterruptable operation. In addition, in certain embodiments, changes to the synchronization field can be visible to other threads of the target program. As a result, the field can be dynamically updated to refer to a currently-selected instrument implementation.

In addition, some virtual machines restrict routine sizes, so that it may not be possible to insert multiple or large instrument calls into a large routine of the target program. This disclosure therefore also describes systems and methods for instrumenting a target program with calls to static instrumentation. The calls can be inserted into the program code, which can be the source code, interpreted code, compiled code, or the like. Because the calls to the instrumentation are static calls rather than virtual calls in certain embodiments, the footprint of the calls can be small enough to allow large routines to be instrumented.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers can be reused to indicate correspondence between referenced elements. The drawings are provided to illustrate embodiments of the inventions described herein and not to limit the scope thereof.

DETAILED DESCRIPTION

In currently available systems, instruments for profiling a target program often perform a predefined task each time they are run. To provide different instrument functionality, calls to multiple instrument routines are often inserted into a routine of the target program. In a typical scenario, a decision tree is constructed for calls to different instruments, such that an appropriate instrument is selected for a given scenario. For example, a user might select a certain type of program profiling that uses one instrument, and he might change the type of profiling to later use another type of instrument. Navigating the decision tree to switch between these instruments can impact execution time of the target program.

This disclosure describes, among other features, systems and methods for using a synchronization mechanism to dynamically update instrumentation during profiling or other analysis of a target program. Using the synchronization mechanism, instruments can be dynamically changed without using a decision tree structure of instruments, thereby saving processing resources. The synchronization mechanism can be a field, such as an object or the like, that is declared to be "volatile" or "synchronized." Advantageously, in certain embodiments, the synchronization field can be atomic, such that updates to instrumentation are performed in one uninterruptable operation. In addition, in certain embodiments, changes to the synchronization field can be visible to other threads of the target program. As a result, the field can be dynamically updated to refer to a currently-selected instrument implementation.

In addition, some virtual machines restrict routine sizes, so that it may not be possible to insert multiple or large instrument calls into a large routine of the target program. This disclosure therefore also describes systems and methods for instrumenting a target program with calls to static instrumentation. The calls can be inserted into the program code, which can be the source code, interpreted code, compiled code, or the like. Because the calls to the instrumentation are static calls rather than virtual calls, the footprint of the calls can be small enough to allow large routines to be instrumented.

For purposes of illustration, the systems and methods are described herein primarily in the context of performance profiling. However, instrumentation is not limited to performance profiling uses and can also be used for code tracing, debugging and exception handling, logging, object allocation tracking and analysis, code coverage analysis, monitor contention analysis, code execution path visualization, and other program analysis. In addition, although described primarily in the context of managed code, the features described herein can be applied more generally to any type of interpreted code, precompiled code or p-code, or the like, which may or may not run in a virtual machine. The features described herein can also be used with compiled code or source code in certain implementations.

Further, as used herein, the term "routine," in addition to having its ordinary meaning, can include any portion of code, including a procedure, a subroutine, a subprogram, a function, a method, a class, a predicate, or the like.

Figure 1:
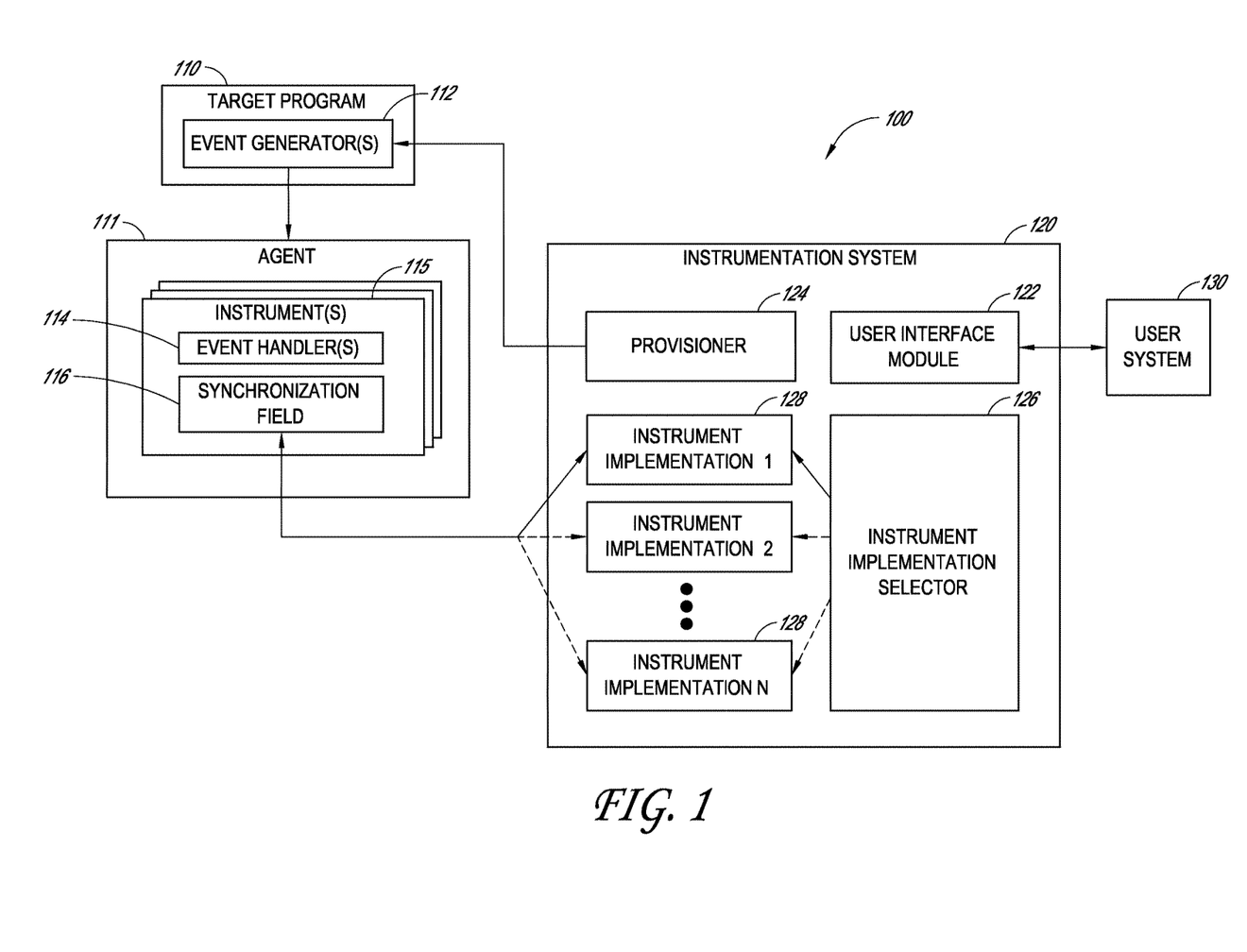
FIG. 1 illustrates a block diagram of an embodiment of an instrumentation environment for dynamically instrumenting a target program.

FIG. 1 illustrates an embodiment of an instrumentation environment 100 for dynamically instrumenting a target program 110. The instrumentation environment 100 includes an instrumentation system 120 and an agent 111 that instrument the target program 110 for performance profiling or for other analysis. Advantageously, in certain embodiments, the instrumentation system 120 can change the instrumentation used to analyze the target program 110 during runtime more efficiently and with less impact to the size of the target program 110 than in currently-available systems.

The instrumentation system 120 and the agent 111 can be implemented in one or more machines, such as physical computer systems. Likewise, the target program 110 can be implemented in one or more machines. In addition, the target program 110, the instrumentation system 120, and the agent 111 can be implemented in separate machines, including machines distributed over a network, such as a LAN, WAN, the Internet, or the like.

In certain embodiments, the instrumentation system 120 and the agent 111 can be used for profiling or monitoring the target program 110. This profiling can include memory analysis, performance analysis, and/or coverage analysis of the target program 110, among other features. Memory analysis can include identifying and resolving memory leaks and object cycling to increase program efficiency and stability. Performance analysis can include identifying and resolving bottlenecks and thread deadlocks to increase program performance and scalability. Coverage analysis can include identifying unexecuted lines of code during unit testing to increase test coverage and program correctness. In certain embodiments, the instrumentation system 120 and/or the agent 111 can include some or all of the features of the JProbe Java profiler commercially available from Quest Software, Inc. of Aliso Viejo, Calif. However, the instrumentation system 120 is not limited to profiling Java programs and can profile programs written in a variety of languages, such as C#, C++, Visual Basic, and other interpreted and/or managed languages, among others. Also, as described above, the instrumentation system 120 and/or the agent 111 can be used for analysis other than profiling.

In the depicted embodiment, the instrumentation system 120 includes a user interface module 122, a provisioner 124, an instrument implementation selector 126, and one or more instrument implementations 128. The user interface module 122 can include hardware and/or software for providing a user interface that provides functionality for controlling operation of the instrumentation system 120. The user interface module 122 can provide the user interface to a user system 130, which can be a computer system under operation of a user. In one embodiment, the instrumentation system 120 and/or the target program 110 are installed on the user system 130.

Through the user interface, the user can select what types of information to gather from the target program 110 and what granularity of information to obtain. A variety of user interfaces could be generated by the user interface module 122. Examples of user interfaces that can be used for profiling are described below with respect to FIGS. 4 through 6.

The provisioner 124 can include hardware and/or software for provisioning the target program 110 with one or more event generators 112. The provisioner 124 can insert one or more event generators 112 in the target program's 110 source code, interpreted code, managed code, compiled code, or the like. If the target program 110 is written in Java, for example, the provisioner 124 can embed the event generators 112 in Java bytecode of the program 110. In one embodiment, one event generator 112 is inserted into several routines of the target program 110. However, several event generators 112 can also be inserted into a single routine of the target program 110. For example, a single routine might be instrumented with a memory analysis event generator, a performance analysis event generator, and/or a coverage analysis event generator.

In an embodiment, the event generators 112 can be routines, instructions, or the like that make calls to or otherwise invoke one or more instruments 115 of the agent 111. A single event generator 112 might make a call to a single instrument 115, for example. The event generator 112 can make a call in response to some action occurring, such as entry of a routine of the target program 110. Many event generators 112, each possibly having different program analysis purposes, can be instrumented in a single routine of the target program 110.

The instruments 115 act as placeholder instruments in certain embodiments because they may not directly gather information about the program's events. Instead, in certain embodiments, each instrument 115 can include one or more event handlers 114 and a synchronization field 116. The synchronization field 116 can include a reference to a currently-selected event handler 114, which in turn can call a selected instrument implementation 128. More generally, the synchronization field 116 can include a reference to a callback routine in certain embodiments, which can in turn call a selected instrument implementation 128.

Advantageously, in certain embodiments, the instruments 115 are static instruments, rather than dynamic or virtual instruments. Static instruments can be used because dynamic class modification may not always be available in a virtual machine, and when it is, dynamic class modification can have severe restrictions that can cause many complications. In addition, in some Java implementations, calls (from the event generators 112) to static methods in the instrument 115 can be used because the size of the bytecode for static method calls can be smaller than the size for virtual calls, and Java can impose a maximum size on the bytecode of a method.

For example, in some systems, the size for a static event generator 112 call could be about 3 bytes, whereas a size for a virtual call could be between about 4 to 7 bytes. If a routine of the target program 110 were instrumented with several (possibly hundreds) of event generators 112, the smaller size for static calls could add up to large memory savings. Thus, smaller, static instruments 115 can allow larger program 110 methods to be instrumented within the limits imposed by Java. Using static calls can be particularly beneficial for routines generated by Java foundation classes or the like, which can be very close in size to the maximum size limit imposed by Java.

The synchronization field 116 can be an object, variable, pointer, method, combinations of the same, or the like, that provides synchronization for the event handlers 114. The synchronization field 116 can be a field that is declared using a synchronization primitive, such as the "volatile" or "synchronized" keywords in some programming languages. Keywords other than volatile or synchronized can be used in other languages to obtain the same or similar functionality.

In certain embodiments, the synchronization field 116 can be modified dynamically during execution of the target program 110. For example, in one embodiment, the implementation selector 126 can modify the synchronization field 116 to refer to a different event handler 114, which calls a selected instrument implementation 128. The instrument implementation selector 126 can be under the control of a user directly or indirectly via the user interface module 122. Alternatively, the instrument implementation selector 126 can automatically select instrument implementations 128 according to program analysis criteria of the target program 110, such as real-time information regarding the target program's 110 environment.

Advantageously, in certain embodiments, the synchronization field 116 can be atomic, such that updates to a new event handler are performed in one uninterruptable operation. Atomicity of the synchronization field 116 can reduce or prevent the risk of a thread of the target program 110 calling (e.g., via the event generator 112) an invalid value, resulting in possible failure.

Advantageously, in certain embodiments, the synchronization field 116 can also provide the benefit of changes to the synchronization field 116 being visible (and possibly immediately visible) to other threads of the target program 110. If a change were not visible, other threads in the target program 110 might not execute a newly-selected instrument implementation 128. Instead, these threads could continue to use a previously-selected instrument implementation 128, perhaps indefinitely, resulting in collected data that is invalid or less useful. Thus, atomicity and visibility can facilitate dynamic changes to the instrumentation during execution of the target program 110.

The synchronization field 116 is merely one example implementation of a synchronization mechanism that can dynamically update instrumentation during program execution. More generally, any appropriate synchronization mechanism can be used, which need not necessarily be a field. The synchronization mechanism can be any call, declaration, field, operation, or the like that provides for atomic changes that are visible (and possibly immediately visible) to other threads of the target program. Operating system calls can be used, for instance, to provide locking features, atomic transactions, and other synchronization benefits useful for the instrumentation system 120. For clarity, the remainder of this specification will refer to synchronization fields, without loss of generality.

Advantageously, in certain embodiments, the synchronization field 116 (or mechanism, etc.) can reduce execution time of the instrumentation, providing for faster program analysis. The execution performance increase can occur at least in part because navigation of a decision tree to switch instrument implementations is avoided. Rather, the event generators 112 can place a single call to an event handler 114, which calls the appropriate (e.g., most recently-selected) instrument implementation 128.

Figure 2:
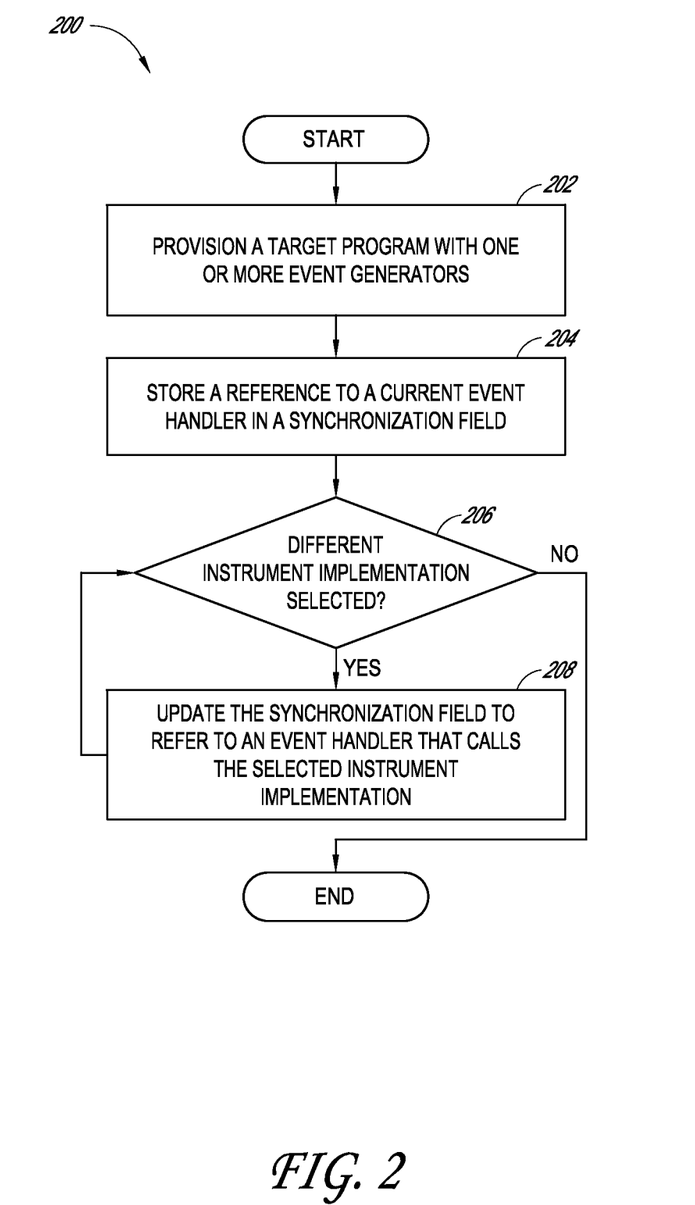
FIG. 2 illustrates a flowchart of an embodiment of an instrumentation process for selecting an instrument implementation during runtime of the target program.

FIG. 2 illustrates an embodiment of an instrumentation process 200 for selecting an instrument implementation. The instrumentation process 200 can be implemented by the instrumentation system 120 described above. Advantageously, in certain embodiments, the instrumentation process 200 can dynamically select instrumentation during runtime of a target program.

At block 202, a target program is provisioned with one or more event generators. As described above, the event generators can be adapted to call event handlers of an agent. Block 202 can be implemented by the provisioner 124 described above. At block 204, a reference to a current event handler is stored in a synchronization field. This block can be performed by the provisioner 124 (e.g., during initialization of the target program) or by the instrument implementation selector 126. The current event handler can refer to a current instrument implementation 128, as described above.

In some embodiments, the instrument can have a default empty event handler referenced or pointed to by the synchronization field. This default empty event handler may not collect data. In Java, providing this default empty event handler can avoid problems that could occur during initialization of the Java Virtual Machine if the instrument began analyzing the program too early. In addition, the default empty event handler can allow the target program 110 to load and begin execution without impacting or substantially impacting performance of the target program 110.

It is determined at decision block 206 whether a different instrument implementation has been selected. A different instrument implementation can be selected programmatically by the implementation selector 126 in response to a request from a user. For example, a user of the user system 130 could a select program analysis option from a user interface generated by the user interface module 122. In response, the instrument implementation selector 126 could select one or more different instruments 128. Alternatively, a different instrument implementation can be selected automatically by the implementation selector 126 without user input. The different instrument implementation can be selected after the program loads to reduce the impact on program initialization performance. In addition, different instrument implementations can be selected at any time during program execution, for example, to observe different behavior of the program.

If a different instrument implementation is selected at decision block 206, the synchronization field is updated at block 208 to refer to an event handler that calls the selected instrument implementation. The instrument implementation selector 126 can perform the functions of this block. The instrumentation process 200 then loops back to decision block 206, effectively waiting for a change to the instrument implementation. On the other hand, if a different instrument implementation was not selected at decision block 204, the instrumentation process 200 ends.

The instrumentation process 200 can be illustrated at least in part with example code. The following example code is simplified for clarity, and additional (or fewer) features may be included in various implementations.

Agent Code Example

```
interface MethodEventHandler {void methodEntry( );}
class EmptyMethodEventHandler implements MethodEventHandler {public void method Entry( ){ }
}
class NormalMethodEventHandler( ) implements MethodEventHandler {public void method Entry( ){Agent.methodEntry0( );}
}
public class Agent {
    private static volatile MethodEventHandler method_handler=new EmptyMethodEventHandler( );
    public static void method Entry( ){method_handler.methodEntry( );
    }
    static native void methodEntry0( );
}
```

In the code example above, an agent having two event handlers is provided. These event handlers include an EmptyMethodEventHandler and a NormalEventHandler. A synchronization field, Agent.method_handler, is initialized to be an EmptyMethodEventHandler object. The Agent.method_handler field can call the method "methodEntry( )" which for the EmptyMethodEventHandler class is an empty method. Thus, the default instrument implementation referred to by the synchronization field is an implementation that does not collect data.

The instrument selector 126 (code not shown) can update the Agent.method_handler field to refer to an instance of NormalEventHandler to enable data collection. In this case, the method_handler field could be used to call the methodEntry( ) method of the NormalMethodHandler class. This methodEntry( ) method is not empty, but instead calls Agent.methodEntry0( ), a native method defined in the Agent class. The native method "methodEntry0( )" can be one of the instrument implementations 128. The native method "methodEntry0( )" can be implemented in native code, such as a language other than Java, for performance reasons. Example functionality of the methodEntry0( ) method is described below with respect to FIG. 3.

Different event handlers that change functionality could be provided in the instrument. For example, the following event handler can collect method entry data when a user has selected a performance profiling option:

Event Handler Example

```
class ProfilingMethodEventHandler implements MethodEventHandler {public void methodEntry( ){if (isProfiling( )) Agent.methodEntry0( );}
}
```

In certain embodiments, the Agent class can be modified so as to avoid certain initialization problems. For example, suppose Object.<init>( ) was instrumented for method entry, where "Object" represents the Object class of Java. Initialization of the method_handler field can create a new EmptyMethodEventHandler whose constructor would call Object.<init>( ). This would result in a call to Agent.methodEntry( ) while the method_handler was still null, causing an exception. One solution to this problem is to avoid instrumenting Object.<init>( ). This solution may not be possible for the event in question, for example, for object allocation events (see FIG. 3). Instead, in certain embodiments, the static methodEntry( ) event handler method can test the volatile method_handler field against null before dispatching.

Figure 3:
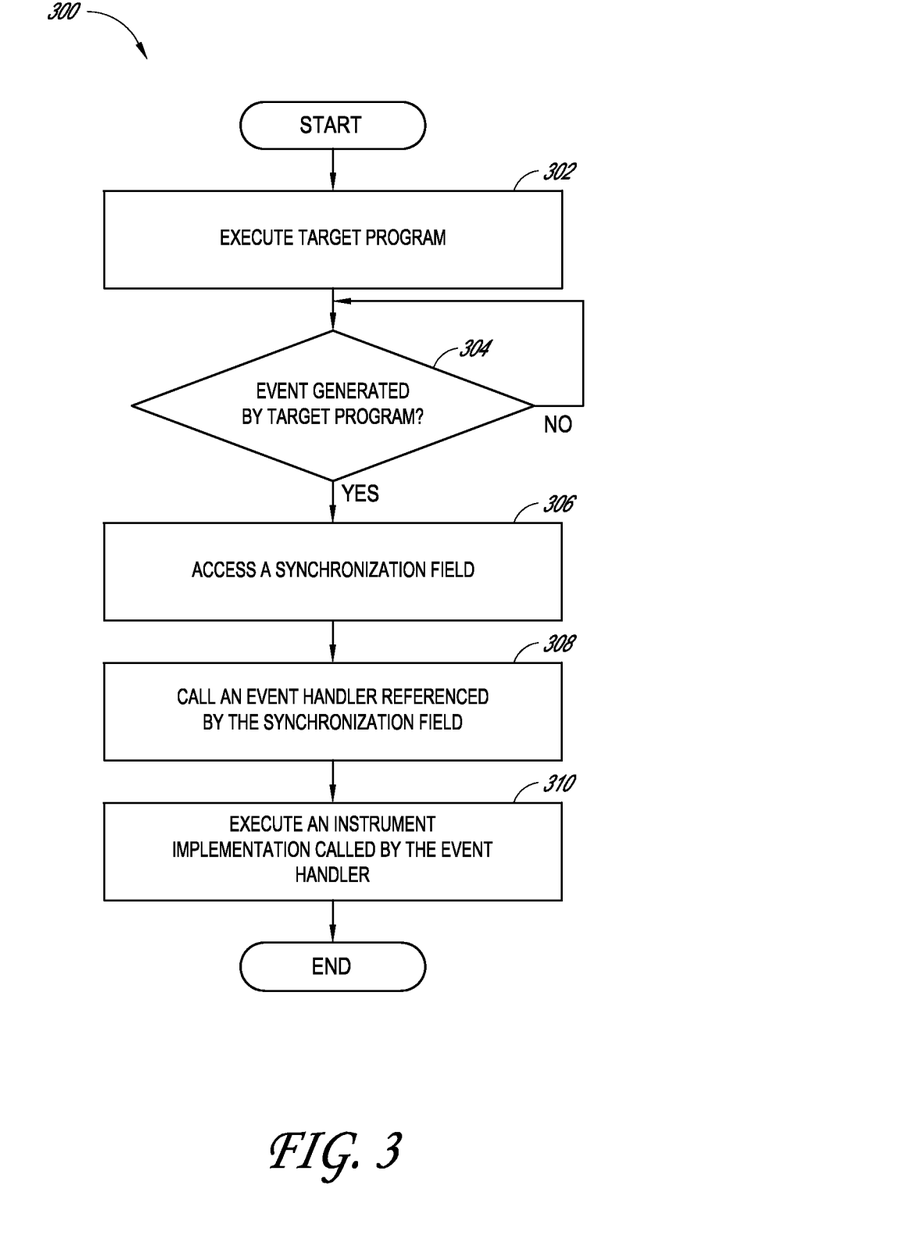
FIG. 3 illustrates a flowchart of an embodiment of a profiling process for executing the selected instrument implementation.

FIG. 3 illustrates an embodiment of a profiling process 300 for executing a dynamically-selected instrument implementation. The profiling process 300 can be implemented by the instrumentation system 120 described above. Advantageously, in certain embodiments, the profiling process 300 can efficiently profile a target program with dynamically-selected instrumentation.

At block 302, a target program is executed. During execution of the program, it is determined at decision block 304 whether an event has been generated by the program. The event can be generated by the event generator 112 described above. If no event has been generated, the profiling process 300 loops back to decision block 304, effectively waiting to proceed until an event is generated. However, if an event was generated, a synchronization field of an instrument (e.g., the instrument 115) is accessed at block 306.

Some examples of events can include trigger events, method events, and object events. Trigger events can be used by the instrumentation system 120 to selectively turn on or turn off analysis features of the instrumentation system 120. Method events can include the entry of a method and the exit of a method. An instrument implementation 128 (such as the "methodEntry0" native method described above) might determine an amount of time between method entry and exit events. This timing information could be reported to a user, allowing the user to find and fix performance bottlenecks.

Object events might include object allocations, object deallocations, and the like. An instrument implementation 128 could use these events to determine whether object cycling is occurring, such that objects are created and destroyed rapidly. An instrument implementation 128 could also use these events to determine when objects are held but are no longer needed. Object events can therefore be useful in tuning garbage collection.

At block 308, an event handler referenced by the synchronization field is called, and at block 310 a currently-selected instrument implementation is called and executed by the event handler. The instrument implementation may perform any of a variety of tasks, including any of the program analysis tasks described above.

Figure 4:
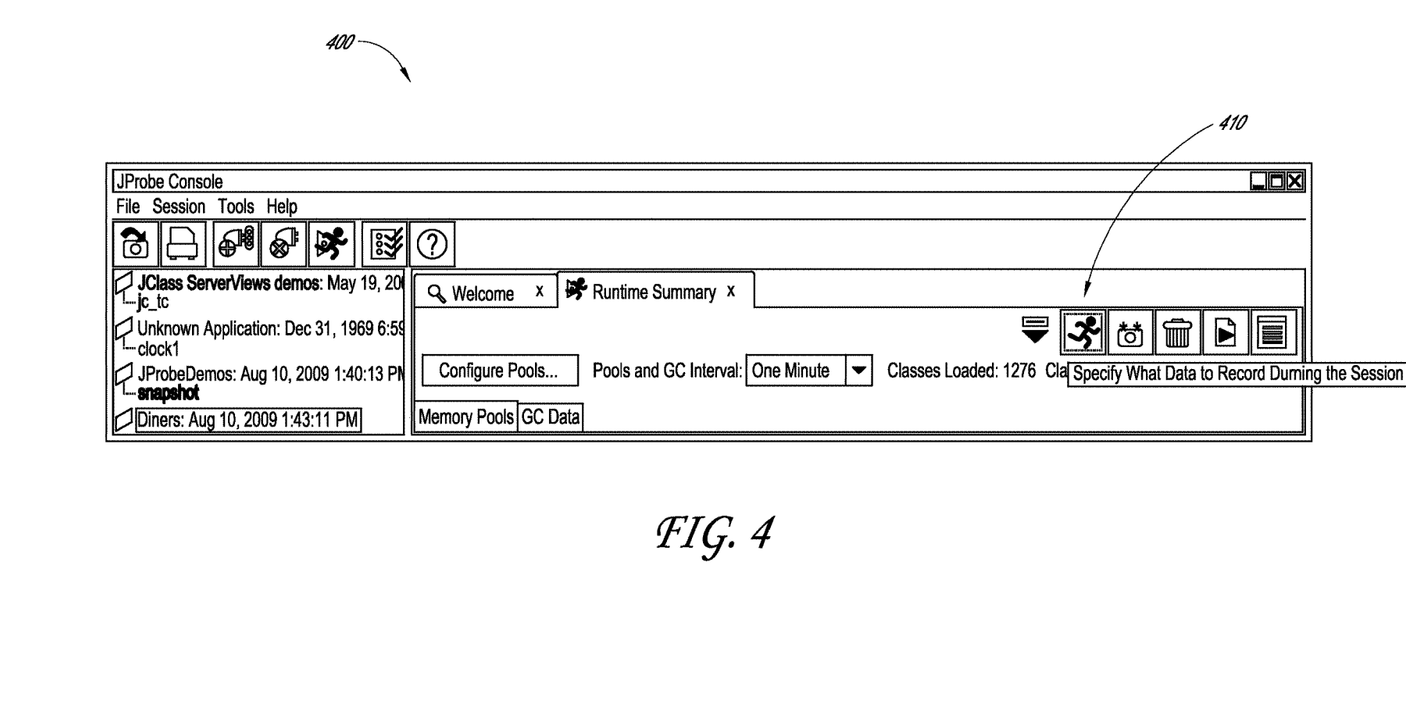
FIGS. 4 through 6 illustrate embodiments of user interfaces that provide functionality for a user to control profiling of the target program.
Figure 5:
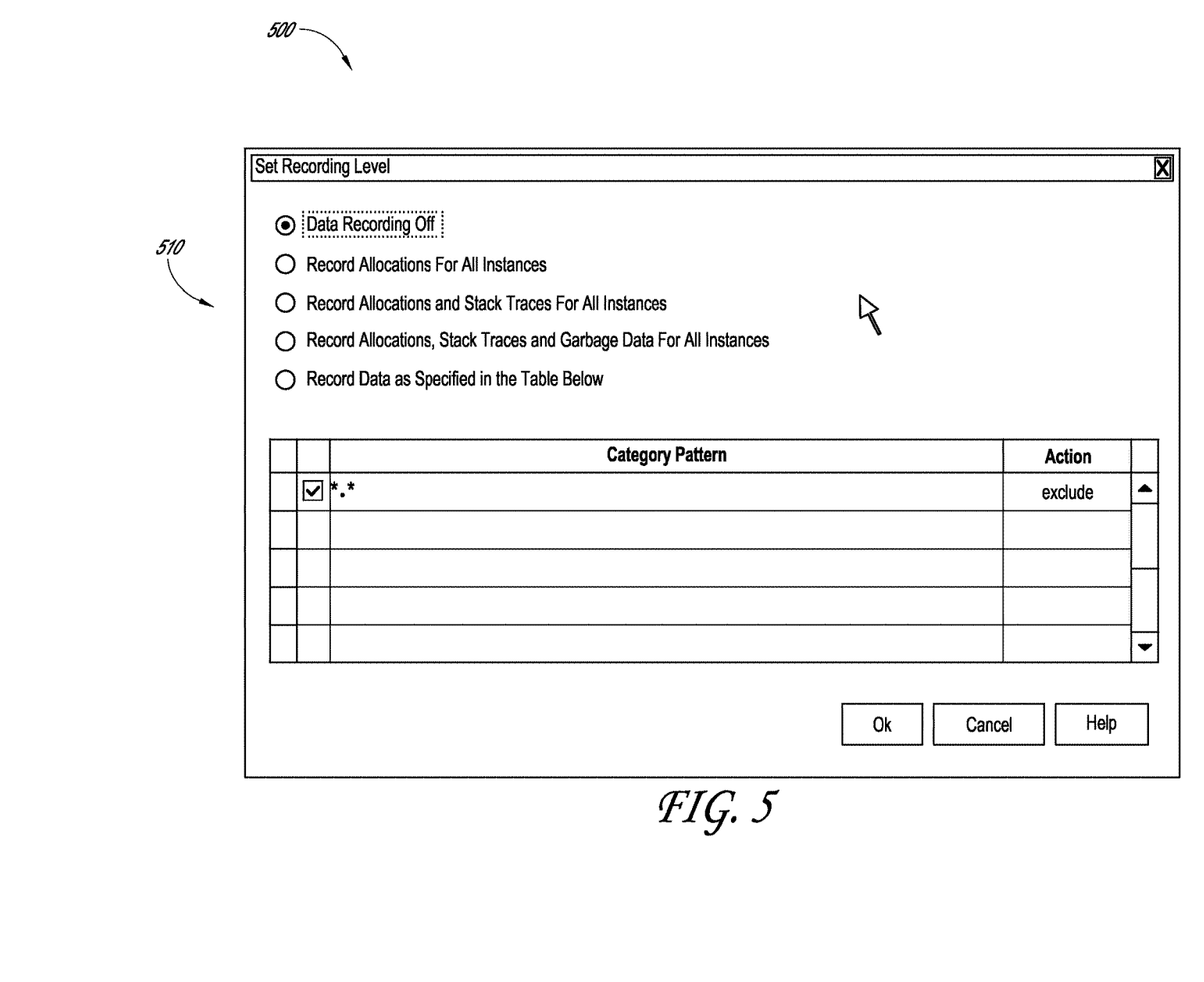
Figure 6:
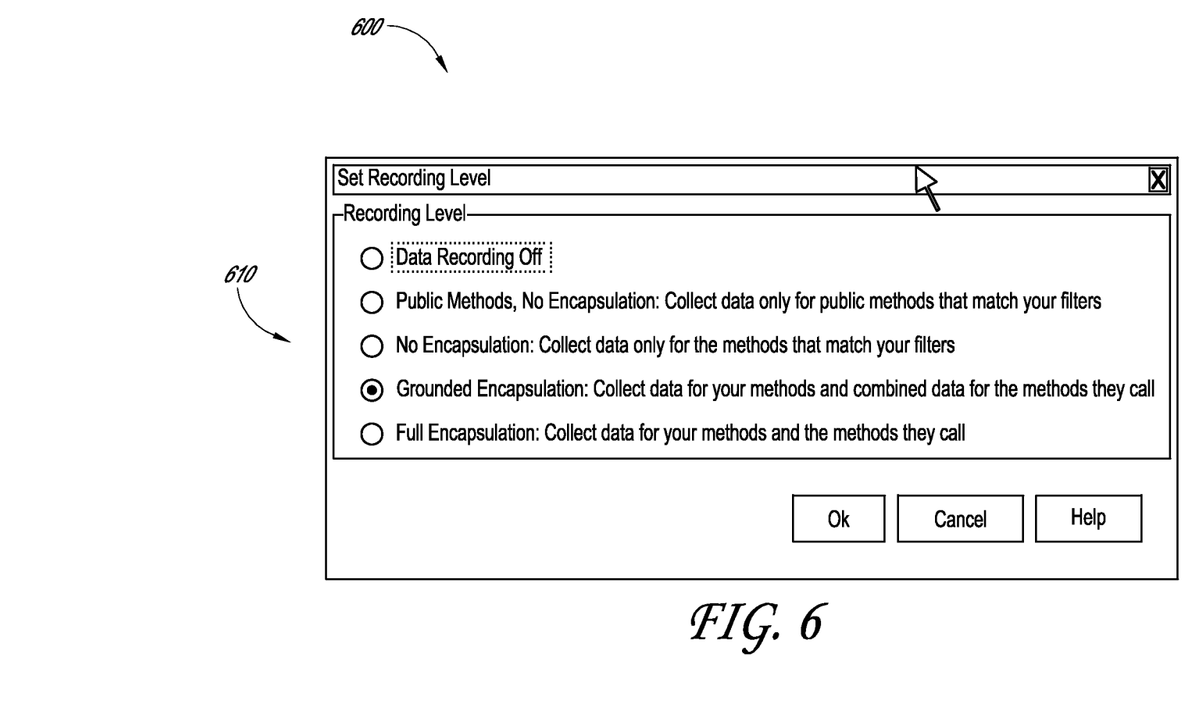

FIGS. 4 through 6 illustrate embodiments of user interfaces 400, 500, and 600 that provide functionality for a user to control profiling of a target program. The user interfaces 400, 500, and 600 are examples of user interfaces that can be generated by the user interface module 122 of the instrumentation system 120. The user interfaces 400, 500, 600 can, for instance, allow a user to specify criteria or preferences for analyzing the target program. The user interfaces 400, 500, and 600 can allow a user to directly or indirectly select the types of instrument implementations that are used to profile a target program.

Referring to FIG. 4, the user interface 400 is shown. The user interface 400 is a profiler console, which allows a user to access various program profiling settings. For example, a button 410 on the console allows the user to access instrumentation settings. Examples of these instrumentation settings are shown in FIGS. 5 and 6.

Referring to FIG. 5, the user interface 500 is shown. The user interface 500 displays instrumentation settings 510 for memory instrumentation. These settings 510 include the option to turn data recording off, recording allocations for all instances, and so on. User selection of one of the settings 510 can cause the instrument implementation selector 126 of FIG. 1 to select one or more instrument implementations 128. For example, selecting "data recording off" could cause the instrument implementation selector 126 to point a synchronization field to a "not collecting" event handler, as described above with respect to FIG. 2.

User selection of one of the settings 510 shown can cause one or multiple instrument implementations to be selected. For example, a single setting 510 selection can cause instrument implementations to be set for some or all routines in the target program. Although not shown, in some embodiments, actual instrument implementations can be selected directly via a user interface.

Referring to FIG. 6, the user interface 600 is shown. Like the user interface 500, the user interface 600 displays instrumentation settings 610. The instrumentation settings 610 of FIG. 6, however, are example settings for performance profiling. These settings 610 can be used to collect data regarding method entry and exit timing and the like. Like the settings 510 of FIG. 5, user selection of one of the settings 510 shown can cause one or more instrument implementations to be selected.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a processor, controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for dynamically changing instrumentation used to profile a program during program execution, the system comprising:
  memory comprising computer-executable instructions stored thereon, the instructions configured to implement:
    a provisioner configured to insert into code of a program an event generator comprising a static call to a static instrument, the static instrument acting as a placeholder instrument, the static instrument comprising:
      first and second instrument implementations, wherein at least one of the first and second instrument implementations is configured to gather data from the program in response to being invoked;
      first and second event handlers configured to be responsive to an event generated by the event generator, wherein the first event handler invokes the first instrument implementation and the second event handler invokes the second instrument implementation; and
      a synchronization field that is declared using a synchronization primitive, the synchronization field comprising a reference to the first event handler, the synchronization field configured to enable dynamic selecting, during execution of the program, of which event handler of the first and second event handlers is invoked in response to the static call, wherein changes made to the synchronization field during the execution are visible during the execution to multiple threads of the program;

an instrument implementation selector configured to dynamically select, during execution of the program, according to an instrumentation setting specified in a table, one of the first and second instrument implementations used to analyze the program during execution of the program by at least:

receiving a user selection of program analysis criteria via the table, the user-selected program analysis criteria specifying at least one of an inclusion and an exclusion of a category pattern; and based at least in part on the user-selected program analysis criteria, updating the synchronization field to refer to the second event handler of the static instrument instead of the first event handler of the static instrument such that the second instrument implementation is invoked, instead of the first instrument implementation, in response to the event generated by the event generator, wherein the second instrument implementation is configured to profile the program; and one or more processors configured to implement the computer-executable instructions.

2. The system of claim 1, wherein the event comprises a method event.

3. The system of claim 1, wherein the event comprises an object event.

4. A method of profiling a program during program execution, the method comprising:

by a computer system comprising computer hardware:

inserting into code of a program an event generator comprising a static call to a static agent instrument;

wherein the static agent instrument acts as a placeholder instrument and comprises:

first and second instrument implementations, wherein at least one of the first and second instrument implementations is configured to gather data from the program in response to being invoked;

first and second event handlers configured to be responsive to an event generated by the event generator, wherein the first event handler invokes the first instrument implementation and the second event handler invokes the second instrument implementation; and a synchronization field configured to enable dynamic selecting bar an instrument implementation selector, during execution of the program, according to an instrumentation setting specified in a table, of which event handler of the first and second event handlers is invoked in response to the static call, wherein changes made to the synchronization field during the execution are visible during the execution to multiple threads of the program, wherein the synchronization field is declared using a synchronization primitive;

storing a reference to the first event handler in the synchronization field;

receiving a user selection of a program analysis preference via the table, the user-selected program analysis preference specifying at least one of an inclusion and an exclusion of a category pattern;

based at least in part on receiving the user-selected program analysis preference, updating the synchronization field of the static agent instrument to refer to the second event handler of the static agent instrument instead of the first event handler of the static agent instrument; and calling the second event handler responsive to the event being generated by the event generator, thereby causing the second event handler to call the second instrument implementation, the second instrument implementation being configured to profile the program.

5. The method of claim 4, further comprising providing a user interface that provides functionality for a user to provide the program analysis preference during program execution.

6. The method of claim 4, further comprising updating the synchronization field to refer to a third event handler configured to call a third instrument implementation in response to receiving a second user program analysis preference.

7. The method of claim 4, wherein the event comprises a method event.

8. The method of claim 4, wherein the event comprises an object event.

9. The method of claim 4, wherein the computer system comprises multiple computing devices.

10. The method of claim 4, wherein the synchronization field comprises a volatile field.

11. A non-transitory computer-readable storage medium comprising computer-executable program instructions configured to implement a method of analyzing a program, the method comprising:

by one or more processors coupled with computer memory:

inserting into code of a program an event generator comprising a static call to a static instrument, the static instrument acting as a placeholder instrument, the static instrument comprising:

first and second instrument implementations, wherein at least one of the first and second instrument implementations is configured to gather data from the program in response to being invoked;

first and second event handlers configured to be responsive to an event generated by the event generator, wherein the first event handler invokes the first instrument implementation and the second event handler invokes the second instrument implementation; and a synchronization mechanism;

using the synchronization mechanism to reference the first event handler, wherein the synchronization mechanism is declared using a synchronization primitive, wherein the synchronization mechanism is configured to enable dynamic updating, during execution of the program, of which event handler of the first and second event handlers is invoked in response to the static call, and wherein updates made to the synchronization mechanism during the execution are visible during the execution to multiple threads of the program;

determining, during the execution of the program, whether the second instrument implementation has been selected, by an instrumentation implementation selector, according to a user-specified instrumentation setting in a table, the user-specified instrumentation setting specifying at least one of an inclusion and an exclusion of a category pattern; and in response to determining that the second instrument implementation has been selected, updating the reference to the first event handler of the static instrument to refer to the second event handler such that the second instrument implementation is invoked, instead of the first instrument implementation, in response to the event generated by the event generator.

12. The non-transitory computer-readable storage medium of claim 11, wherein the synchronization mechanism comprises a synchronization field.

13. The non-transitory computer-readable storage medium of claim 11, wherein the synchronization mechanism comprises a volatile field.

14. The non-transitory computer-readable storage medium of claim 11, wherein the synchronization mechanism comprises an operating system call.

15. The non-transitory computer-readable storage medium of claim 11, wherein the code comprises managed code.

16. The non-transitory computer-readable storage medium of claim 11, wherein the first event handler is configured to collect no data from the program.

17. The non-transitory computer-readable storage medium of claim 11, wherein the first event handler is configured to collect data from the program upon entry of a routine of the program.

\* \* \* \* \*